US008776469B2

(12) United States Patent
Morey

(10) Patent No.: US 8,776,469 B2
(45) Date of Patent: Jul. 15, 2014

(54) ADJUSTABLE HANGER ASSEMBLY FOR USE WITH METAL BAR JOISTS AND BEAMS

(76) Inventor: Douglas H. Morey, Clarendon Hills, IL (US)

(*) Notice: Subject to any disclaimer, the term of this patent is extended or adjusted under 35 U.S.C. 154(b) by 727 days.

(21) Appl. No.: 12/520,817

(22) PCT Filed: Jan. 10, 2008

(86) PCT No.: PCT/US2008/050740
§ 371 (c)(1),
(2), (4) Date: Dec. 8, 2009

(87) PCT Pub. No.: WO2008/086468
PCT Pub. Date: Jul. 17, 2008

(65) Prior Publication Data
US 2010/0101167 A1    Apr. 29, 2010

Related U.S. Application Data

(60) Provisional application No. 60/884,257, filed on Jan. 10, 2007.

(51) Int. Cl.
| E04B 9/06 | (2006.01) |
| F16B 7/04 | (2006.01) |
| E04B 9/18 | (2006.01) |
| F16B 43/00 | (2006.01) |
| F16B 7/18 | (2006.01) |

(52) U.S. Cl.
CPC ............... *F16B 7/0493* (2013.01); *F16B 7/18* (2013.01); *E04B 9/183* (2013.01); *F16B 43/00* (2013.01)
USPC .......................................... 52/506.06; 248/72

(58) Field of Classification Search
USPC ............. 52/506.06–506.09; 248/72; 411/400, 411/401; 403/187, 189, 171–174
See application file for complete search history.

(56) References Cited

U.S. PATENT DOCUMENTS

| 2,080,916 A * | 5/1937 | Hayden ........................... 52/690 |
| 2,276,139 A | 3/1942 | Anderson et al. |
| 2,717,562 A | 9/1955 | Ewing |

(Continued)

OTHER PUBLICATIONS

Jaco Art L.L.C., Adjustable Roof Frame (understood to be on sale or in public use at least as early as May 18, 2005). www.roofframes.com.

(Continued)

*Primary Examiner* — William Gilbert
(74) *Attorney, Agent, or Firm* — Polster, Lieder, Woodruff & Lucchesi, L.C.

(57) ABSTRACT

An adjustable hanger assembly for hanging support rods or ceiling fixtures includes two adjacent spanning angles or channels having at least one clamp assembly at each end thereof and at least one fixture hanging assembly disposed between the ends of the spanning angles or channels. The clamp for use with joists utilizing angles includes legged and washer clamp plates, fastener, and fastening device. The clamp for use with beams utilizing angles includes alternate legged clamp plate, fastener hook, and fastening device. The fixture hanging assembly includes legged and washer fixture plate, hanger rod with threaded end, and fastening. Each legged clamp plates, alternate legged clamp plates, and legged fixture plates is adapted to ride horizontally along top of spanning angles or channels. The load bearing capacity of the angles or channels is increased by bracing these members against each other at clamp assembly and fixture hanging assembly locations.

6 Claims, 11 Drawing Sheets

(56) References Cited

U.S. PATENT DOCUMENTS

| | | | |
|---|---|---|---|
| 2,838,832 A | 6/1958 | Potter | |
| 2,990,920 A | 7/1961 | Hoffman, Jr. | |
| 2,994,415 A | 8/1961 | Halle | |
| 3,392,499 A | 7/1968 | McManus | |
| 3,527,007 A | 9/1970 | McManus | |
| 3,642,150 A | 2/1972 | Zizak | |
| 3,964,218 A | 6/1976 | Ho | |
| 4,408,928 A * | 10/1983 | Steinke | 403/320 |
| 4,472,917 A | 9/1984 | Alderton et al. | |
| 4,569,177 A | 2/1986 | Ottinger | |
| 4,620,397 A | 11/1986 | Simpson et al. | |
| 4,660,799 A | 4/1987 | Butland | |
| 4,685,646 A | 8/1987 | Harrison | |
| 4,798,029 A * | 1/1989 | Carlton | 52/177 |
| 5,259,165 A * | 11/1993 | Koyama | 52/506.06 |
| 5,292,096 A | 3/1994 | Bodenheimer | |
| 5,335,469 A | 8/1994 | Stuart | |
| 5,511,354 A | 4/1996 | Eidson | |
| 5,516,068 A | 5/1996 | Rice | |
| 5,560,576 A | 10/1996 | Cargill | |
| 5,577,353 A | 11/1996 | Simpson | |
| 5,647,175 A | 7/1997 | Smyth | |
| 5,743,063 A | 4/1998 | Boozer | |
| 5,857,292 A | 1/1999 | Simpson | |
| 5,964,042 A | 10/1999 | Carper | |
| 6,098,942 A * | 8/2000 | Heath | 248/228.6 |
| 6,240,682 B1 | 6/2001 | James et al. | |
| 6,341,466 B1 | 1/2002 | Kehoe et al. | |
| 6,470,644 B2 | 10/2002 | James et al. | |
| 6,471,171 B1 | 10/2002 | VanderVelde | |
| 6,609,343 B1 | 8/2003 | Litten | |
| 6,729,083 B1 | 5/2004 | Soyko | |
| 6,837,019 B2 | 1/2005 | Collie | |
| 2006/0254190 A1 * | 11/2006 | Hunt | 52/698 |

OTHER PUBLICATIONS

International Search Report for counterpart International Application No. PCT/US08/50740 (Aug. 8, 2008).

* cited by examiner

ADJUSTABLE HANGER ASSEMBLY FOR USE WITH METAL BAR JOISTS AND BEAMS

FIELD OF THE DISCLOSURE

This disclosure generally relates to adjustable hanger assemblies for metal bar joists or beams and specifically to hanger assemblies that have an adjustable fixture hanging assembly for hanging support rods and/or ceiling fixtures from the hanger assembly.

BACKGROUND OF THE DISCLOSURE

In building construction generally, and in steel-framed building construction in particular, metal bar joists or beams are used as roof framing, typically under corrugated roof decking. The metal bar joists or beams are also used to hang such items as lighting fixtures, sprinkler header assemblies, product conveyors, HVAC equipment, drywall for ceilings, and the like.

Often a desirable location for hanging a fixture from the ceiling will occur between two metal bar joists or beams. To position such a desired hanging point for a ceiling fixture, an angle iron is usually welded in position such that the angle iron spans between respective metal bar joists or beams. Thereafter, the fixture may be attached to the angle iron in the desired location.

The conventional practice of welding the angle iron to the bar joists or beams has several drawbacks. For instance, once welded, the angle iron cannot easily be relocated if the desired location changes; the welding may cause unintended structural damage to the remaining length of the bar joists or beams; the welding may have to be performed from awkward angles, with limited space constraints, making the welding difficult; and the welding must be performed by skilled certified welders, thereby increasing construction costs.

As demonstrated in the following sections, an adjustable hanger assembly is disclosed that can be bolted in place at strategic locations along bar joists or beams, offering a more reliable and adaptable solution to mounting ceiling fixtures from metal bar joists or beams. For example, the hanger assembly of the present disclosure may be employed between respective bar joists or beams to provide a mounting location for fixtures that is adjustable along a span between the respective bar joists or beams.

SUMMARY OF THE DISCLOSURE

An adjustable hanger assembly (hereinafter "hanger assembly") which attaches to and spans between respective metal bar joists or beams is disclosed. This hanger assembly has clamps affixed to respective ends of the hanger assembly for attaching the ends of the hanger assembly to respective bar joists or beams. The hanger assembly includes two spanning angles adjacent to one another, a clamp assembly at each end of the spanning angles, and at least one fixture hanging assembly disposed between the ends of the spanning angles. Angles are asymmetrical and buckle when loaded along their weak axis. The hanger assembly increases the efficiency of the spanning angles by bracing two angles against each other in their weak axis, increasing their load bearing capacity substantially above their capacities as two independent supports. Bracing occurs at each clamp assembly and fixture hanging assembly. For bar joists, the clamp assembly includes a legged clamp plate, a washer clamp plate, a fastener, and a fastening device such as a nut and washer to secure the fastener to the legged clamp plate. For beams, the clamp assembly includes an alternate legged clamp plate, a fastener hook that is threaded at one end, and a fastening device such as a nut to secure the fastener hook to the alternate legged clamp plate. The fixture hanging assembly for joists or beams includes a legged fixture plate, a hanger rod that is threaded at one end, a washer fixture plate, and a fastening device such as a nut to attach the hanger rod to the legged fixture plate. Each of the legged clamp plates, alternate legged clamp plates, and the legged fixture plates are adapted to ride along top of the vertical flanges of the spanning angles.

Each legged clamp plate, alternate legged clamp plate, and legged fixture plate is provided with at least one flange slot which receives a top portion of the spanning angle(s), and an opening to receive a fastener, fastener hook, or hanger rod, respectively. A washer clamp plate may be placed opposite the legged clamp plate (with the spanning angles and bar joists between the legged clamp plate and the washer clamp plate) held together by the fastener. A fastener hook functions as both a washer clamp plate and a fastener, securing the alternate legged clamp plate to the beam (with the spanning angles secured between the alternate legged clamp plate and fastener hook). A washer fixture plate may be placed opposite the legged fixture plate (with the spanning angles between the legged fixture plate and the washer fixture plate) held together by the hanger rod.

An alternate embodiment of the hanger assembly includes two spanning channels, a channel clamp assembly at each end of the spanning channels, and at least one channel fixture hanging assembly disposed between the ends of the spanning channels. Channels offer a higher strength to weight ratio than angles, and are thus an advantageous alternative to angles. However, like angles, channels are asymmetrical and buckle when loaded along their weak axis. An alternate embodiment of the hanger assembly for channels increases the efficiency of the spanning channels by bracing two angles against each other in their weak axis, increasing their load bearing capacity substantially above their capacities as two independent supports. Bracing occurs at each clamp assembly and fixture hanging assembly. For bar joists, the channel clamp assembly includes a channel legged clamp plate, a channel washer clamp plate, a fastener, and a fastening device such as a nut and washer to secure the fastener to the channel top and washer clamp plates. For beams, the channel clamp assembly includes an alternate channel legged clamp plate, a channel fastener hook that is threaded at one end, and a fastening device such as a nut to secure the channel fastener hook to the alternate channel legged clamp plate. The channel fixture hanging assembly for joists or beams includes two channel fixture plates, a hanger rod that is threaded at one end, and a fastening device such as a nut to attach the hanger rod to the channel fixture plates. Each of the channel legged clamp plates, alternate channel legged clamp plates, and channel fixture plates are adapted to ride along the tops of the flanges of the spanning channels.

Each channel legged clamp plate, alternate channel legged clamp plate, and channel fixture plate is provided with at least one opening to receive a fastener, channel fastener hook, or hanger rod, respectively and at least one slot which receives the flange of the spanning channel(s). The shape of the slot is such that the channel is unable to rotate free once the fastening device is tightened in place. A channel washer clamp plate may be placed opposite the channel legged clamp plate (with the spanning channels and bar joists between the channel legged clamp plate and the washer clamp plate) held together by the fastener. A channel fastener hook functions as both a washer clamp plate and a fastener, securing the alternate channel legged clamp plate to the beam (with the spanning channels secured between the alternate channel legged clamp plate and channel fastener hook). A second channel fixture plate may be placed opposite the first channel fixture plate (with the spanning channels between the channel fixture plates) held together by the hanger rod. Each complete hanger assembly can be used to support a hanger rod and/or a ceiling fixture between the bar joists or beams.

DETAILED DESCRIPTION OF THE PREFERRED EMBODIMENTS

Figure 1:
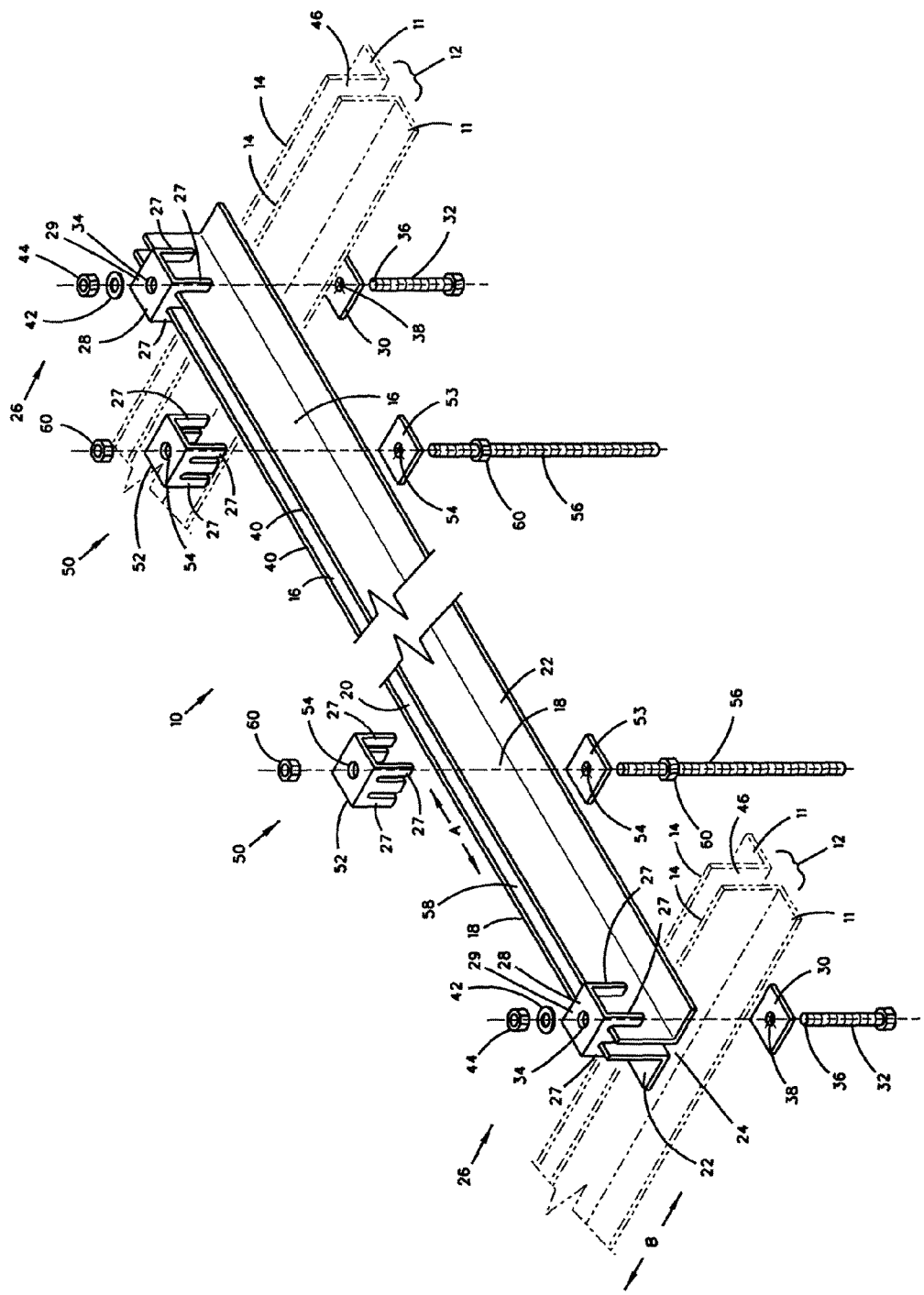
FIG. 1 is an exploded perspective view of a hanger assembly in a joist lower flange application.

Having reference to the drawings, there is shown in FIG. 1 a hanger assembly generally indicated by reference number 10. This hanger assembly 10 is supported by at least two parallel metal bar joists 12 that are spaced apart from one another. The hanger assembly 10 rests upon top edges 14 of each pair of angle irons 11 forming the metal bar joists 12. The hanger assembly 10 includes two angle irons 16 placed "back to back" such that vertical flanges 18 of the angle irons 16 are adjacent to one another and separated by a gap 20. Horizontal flanges 22 of the angle irons 16 extend in opposite directions from one another and away from the vertical flanges 18, thereby forming an overall inverted "T" shape.

The angle irons 16 form spanning angles 24 that span between the two bar joists 12 and are generally perpendicular to the bar joists 12. The spanning angles 24 are held in place on the bar joists 12 by a joist clamp assembly 26 at each end of the spanning angles 24. The joist clamp assembly 26 includes a legged clamp plate 28, a washer clamp plate 30, and a fastener 32. The legged clamp plate 28 includes a planar surface 29 having an aperture 34 therethrough, through which a threaded end 36 of the fastener 32 is received. The washer clamp plate 30 likewise has an aperture 38 therethrough, through which the fastener 32 is received when the spanning angles 24 are secured to each of the bar joists 12.

Figure 2:
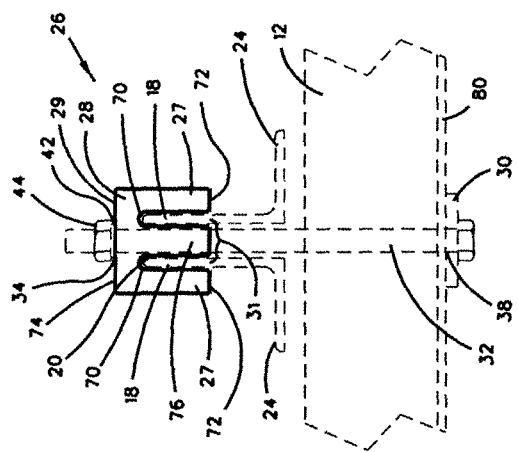
FIG. 2 is a front elevational view of a legged clamp plate in a joist lower flange application.

The legged clamp plate 28 includes a plurality of side legs 27 extending perpendicular to the planar surface 29, defining a structural component flange-receiving passage, referred to herein as a passage 31 (see FIG. 2). While the surface 29 in this exemplary embodiment is planar, virtually any variation to the elevation of this surface can be made and remain within the scope of the present disclosure. The side legs 27 trap at least the top edges 40 of the vertical flanges 18 therebetween, in a sliding engagement, to allow relative movement between the legged clamp plate 28 and the spanning angles 24 in the directions indicated by arrows A in FIG. 1. The fastener 32 is placed through the aperture 38 in the washer clamp plate 30 and through the aperture 34 in the legged clamp plate 28, with the spanning angles 24 and the bar joist 12 between the legged clamp plate 28 and the washer clamp plate 30. The fastener 32 and a fastening device such as a washer 42 and nut 44 may be tightened sufficiently to produce friction within the joist clamp assembly 26 that prevents relative movement between the spanning angles 24 and the bar joist 12 in the directions indicated by arrows B.

On the other hand, when the fastener 32, washer 42 and nut 44 are loosened sufficiently, the friction decreases, allowing relative movement between the spanning angles 24 and the bar joist 12 in the directions indicated by arrows B. A space 46 in the bar joist 12 acts as a "track" for the fastener 32 to slide along when moving the spanning angles 24 relative to the bar joist 12. In this manner, the spanning angles 24 may be secured to the bar joist 12, yet still be adjustable along a length of the bar joist 12.

Similarly, a fixture hanging assembly 50 may be disposed on the spanning angles 24 to facilitate hanging a ceiling fixture therefrom, for example, a light fixture or a ceiling fan. Like the joist clamp assembly 26, the fixture hanging assembly 50 includes a legged fixture plate 52 with plurality of side legs 27 and a washer fixture plate 53, both of which have apertures 54 therethrough for receiving a portion of a hanger rod 56. Like the fastener 32, the hanger rod 56 passes through an aperture 54 in the washer fixture plate 53, through a center slot 58 (coinciding with the gap 20) in the spanning angles 24 and through the aperture 54 in the legged fixture plate 52. One or more fastening devices such as nuts 60 may be used to secure the hanger rod 56 to the legged fixture plate 52. Similar to the joist clamp assembly 26, the fixture hanging assembly 50 may be tightened to prevent relative movement of the fixture hanging assembly 50, and thus the supported ceiling fixture, along the spanning angles 24. On the other hand, the fixture hanging assembly 50 may be loosened to allow relative movement of the fixture hanging assembly 50 lengthwise along the spanning angles 24 generally in the directions indicated by arrows A. As a result, the fixture hanging assembly 50 is adjustable to virtually any location along the spanning angles 24. Each joist clamp assembly 26 and fixture hanging assembly 50 secures the vertical flanges 18 of the spanning angles 24 "back to back" so such that the spanning angles 24 are braced against each other in their weak axis.

Figure 11:
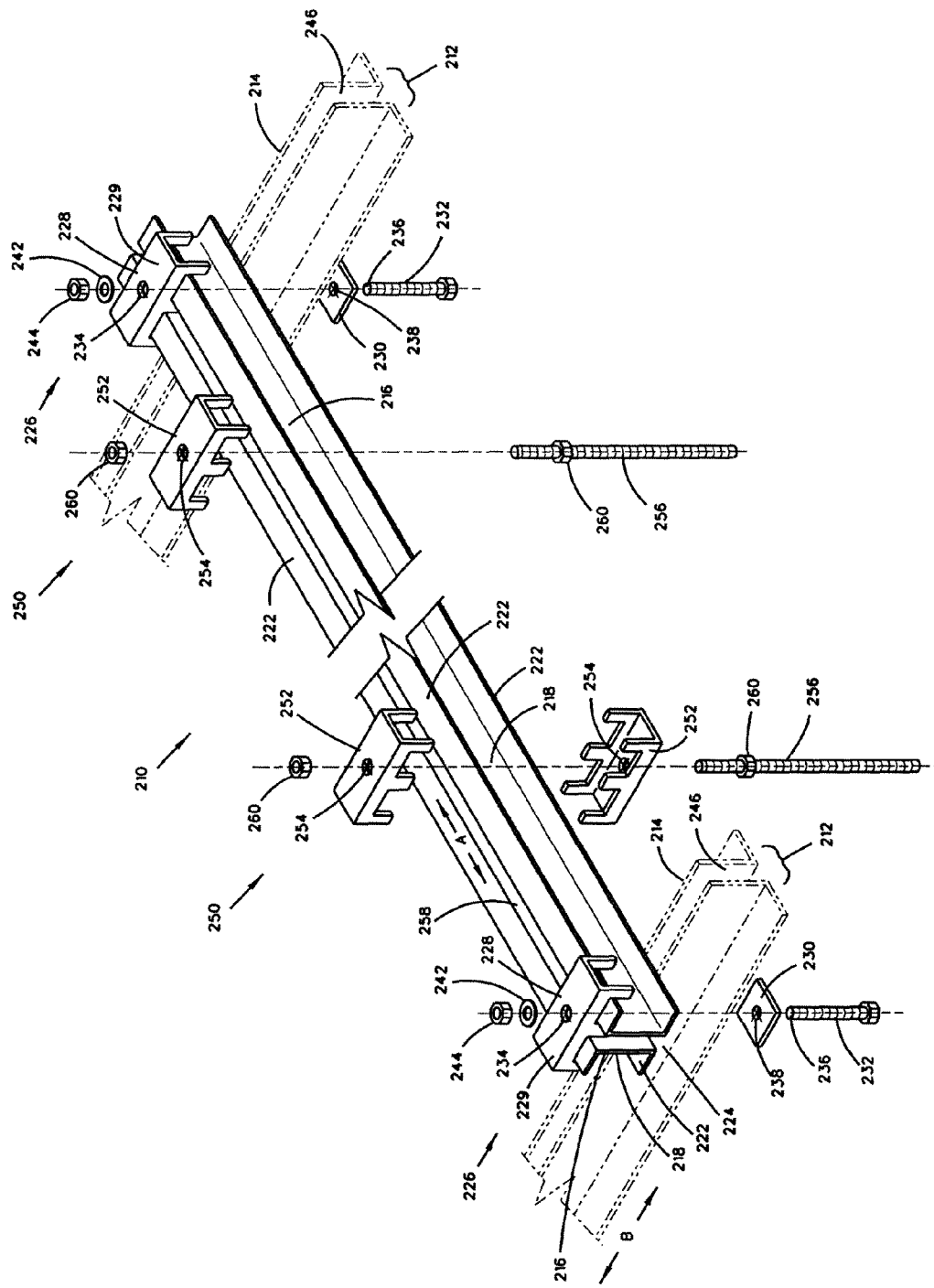
FIG. 11 is an exploded perspective view of yet another alternate hanger assembly with spanning channels in a joist lower flange application.

FIG. 11 shows an alternate embodiment of the hanger assembly 210. As in FIG. 1, this hanger assembly 210 rests upon the top edges 214 of metal bar joists 212. This embodiment of the hanger assembly 210, however, includes two channel members 216 placed "back to back" such that the webbings 218 of the channel members 216 are adjacent to one another in a closely-spaced relationship, with a center slot 258 between them. The webbing 218 of each of the channel members 216 is the vertical portion in FIG. 11 that is intermediate horizontally-oriented top and bottom flanges 222 of the respective channel members 216. The hanger assembly 210 secures the channel members 216 such that the channel members 216 are braced against each other in their weak axis.

Spanning channels 224 defined by the channel members 216 span between the two bar joists 212 and are generally perpendicular to the bar joists 212. The spanning channels 224 are held in place on the bar joists 212 by a clamp assembly 226 at each end of the spanning channels 224. The joist clamp assembly 226 includes a channel legged clamp plate 228, a channel washer clamp plate 230, and a fastener 232. The channel legged clamp plate 228 includes a planar surface 229 having an aperture 234 therethrough, through which a threaded end 236 of the fastener 232 is received. The channel washer clamp plate 230 likewise has an aperture 238 through which the fastener 232 is received when the spanning channels 224 are secured to each of the bar joists 212.

As explained in greater detail below, the channel legged clamp plate 228 includes a plurality of side legs 227 (FIG. 12) extending perpendicular to the planar surface 229, defining a passage 231. The side legs 227 trap the top flanges 222 of spanning channels 224 therebetween, in a sliding engagement, to allow relative movement between the channel legged clamp plate 228 and the spanning channels 224 in the directions indicated by arrows A (see FIG. 11). However, once the fastener 232 is placed through the aperture 238 in the channel washer clamp plate 230 and through the aperture 234 in the channel legged clamp plate 228, with the spanning channels 224 and the bar joist 212 between the channel legged clamp plate 228 and the washer clamp plate 230, the fastener 232, and a fastening device such as a washer 242 and nut 244 may be tightened sufficiently to produce friction within the joist clamp assembly 226 that prevents relative movement between the spanning channels 224 and the bar joist 212 in the directions indicated by arrows B.

On the other hand, when the fastener 232, washer 242 and nut 244 are loosened sufficiently, the friction decreases, allowing relative movement between the spanning channels 224 and the bar joist 212. A space 246 in the bar joist 212 acts as a "track" for the fastener 232 to slide along when moving the spanning channels 224 relative to the bar joist 212. In this manner, the spanning channels 224 may be secured to the bar joist 212, yet still be adjustable along a length of the bar joist 212.

Similarly, a channel fixture hanging assembly 250 may be disposed on the spanning channels 224 to facilitate hanging a ceiling fixture therefrom. Unlike the fixture hanging assembly 50 for use with spanning angles 24 (FIG. 1), the channel fixture hanging assembly 250 includes one or more channel fixture plates 252 and may not include a washer fixture plate similar to the channel washer clamp plate 230. The channel fixture plates 252 have apertures 254 therein for receiving a portion of a hanger rod 256. The hanger rod 256 passes through an aperture 254 in the channel fixture plate 252, through a center slot 258 in the spanning channels 224 and through the aperture 254 in the second channel fixture plate 252. One or more fastening devices such as nuts 260 may be used to secure the hanger rod 256 to the channel fixture plates 252. The channel fixture hanging assembly 250 may be tightened to prevent or loosened to allow relative movement in the directions indicated by arrows A of the channel fixture hanging assembly 250, and thus the supported ceiling fixture, along the spanning channels 224. As a result, the channel fixture hanging assembly 250 is adjustable to virtually any location along the spanning channels 224.

Turning back to the first embodiment, FIG. 2 shows a front elevational view of the joist clamp assembly 26 securing the spanning angles 24 to the bar joist 12. The legged clamp plate 28 has a plurality of side legs 27 extending perpendicularly to a planar surface 29 of the legged clamp plate 28. A first pair of the side legs 27 defines a first passage 31 therebetween and a second pair of the side legs 27 defines a second passage 31 therebetween extending from a bottom edge 72 toward a top edge 74. Between the first pair of side legs 27 defining the first passage 31 is a center tongue 76. In this embodiment, the back side of the legged clamp plate 28 is identical to the front side, where the flange slots 70 of the front side align with respective flange slots 70 of the back side. The flange slots 70 preferably have widths slightly larger than the thickness of the vertical flanges 18. Thus, the legged clamp plate 28 is disposed on the vertical flanges 18 with the vertical flanges 18 being partially disposed in the flange slots 70. The center tongue 76 is disposed between the vertical flanges 18 and keeps the legged clamp plate 28 centered on the vertical flanges 18. The center tongue 76 is preferably equally spaced between the side legs 27, such that the flange slots 70 are of equal width. Additionally, the washer clamp plate 30 is disposed adjacent the lower flanges 80 of the bar joist 12. The fastener 32 extends through the aperture 38 in the washer clamp plate 30, through the space 46 (FIG. 1) of the bar joist 12, through the gap 20 between the vertical flanges 18, through the aperture 34 in the planar surface 29 of the legged clamp plate 28, and through a fastening device such as a washer 42 and nut 44, thus securing the spanning angles 24 to the bar joist 12.

Figure 12:
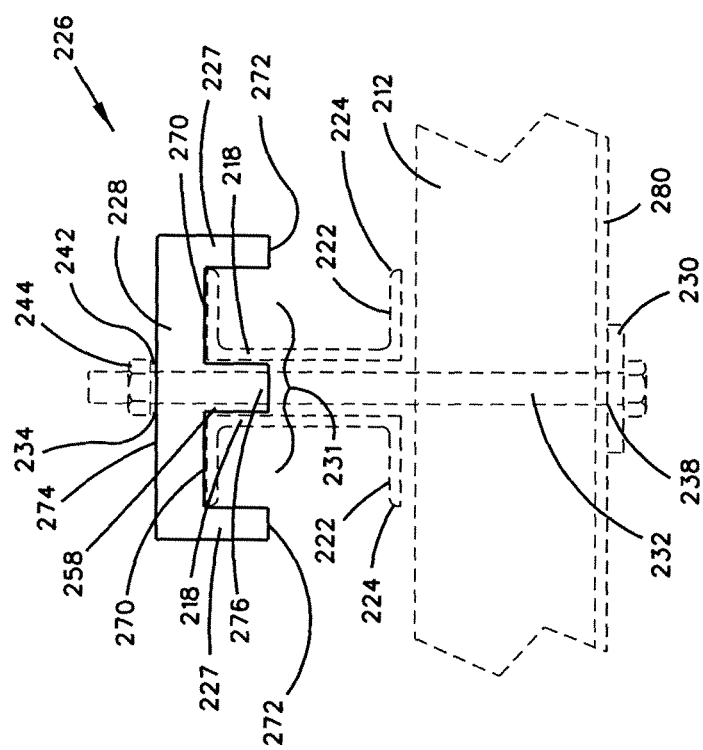
FIG. 12 is a front elevational view of a channel legged clamp plate in a joist lower flange application.

Now returning to the second embodiment, FIG. 12 shows a similar front elevational view of joist clamp assembly 226 securing the spanning channels 224 to the bar joist 212. The channel legged clamp plate 228 has a planar surface 229 with a plurality of side legs 227. A front pair of the side legs 227 define a front passage 231 therebetween, and a rear pair of the side legs 227 define a rear passage 231 therebetween. The channel legged clamp plate 228 further includes a front center tongue 276 between the front pair of side legs 227, and a rear center tongue 276 between the rear pair of side legs 227, dividing each of the passages 231 into two flange slots 270 open along a bottom edge 272 of the channel legged clamp plate 228. The flange slots 270 of the front side align with respective flange slots 270 of the back side. The flange slots 270 preferably have widths equal to one another (with the front center tongue 276 being spaced equally from each of the front side legs 227, and the rear center tongue 276 being spaced equally from each of the rear side legs 227), and slightly larger than the width of the flanges 222. Located between the two flange slots 270 and between the two channel members 216, the center tongues 276 keep the channel legged clamp plate 228 centered between the webbings 218 of the channel members 216. Additionally, the channel washer clamp plate 230 is disposed adjacent the lower flanges 280 of the bar joist 212. The fastener 232 extends through the aperture 238 in the channel washer clamp plate 230, through the space 246 (FIG. 11) in the bar joist 212, through the center slot 258 between the channel members 216, through the aperture 234 in the planar surface 229 of the channel legged clamp plate 228, and through a fastening device such as a washer 242 and nut 244, thus securing the spanning channels 224 to the bar joist 212.

Figure 3:
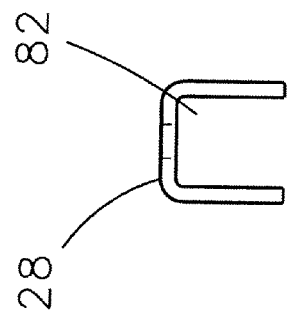
FIG. 3 is a side elevational view of the legged clamp plate of FIG. 2.

FIG. 3 shows a side elevational view of the legged clamp plate 28 of the first embodiment. The legged clamp plate 28 is a generally inverted "U" shaped component, having open sides 82. The open sides 82 provide a material savings and a lighter weight. However, the open sides 82 may alternatively be solid walls, if desired. Likewise, the channel legged clamp plate 228 (FIG. 11) is a generally inverted "U" shaped component.

Figure 4:
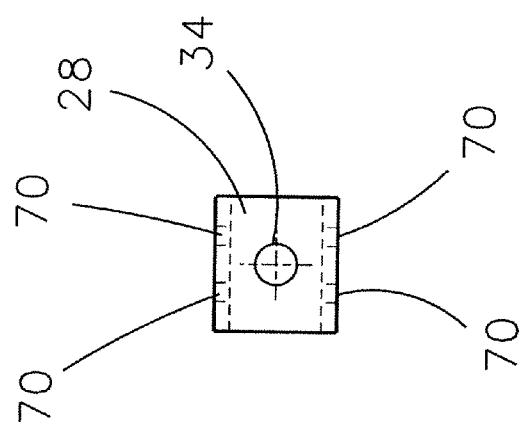
FIG. 4 is a top plan view of the legged clamp plate of FIGS. 2 and 3.

FIG. 4 is a top plan view of the legged clamp plate 28. The legged clamp plate 28 is generally rectangular in shape and the aperture 34 is centered between the front (top of FIG. 4) and back (bottom of FIG. 4), and between the sides, respectively, in this example. While the aperture 34 should remain centered between the open sides, the aperture 34 need not be centered between the front and back of the legged clamp plate 28. For example, the aperture 34 could be closer to the front side than the back side. Furthermore, the overall shape of the legged clamp plate 28 need not be rectangular, but could be virtually any shape, provided that the flange slots 70 on the front side line up with the flange slots 70 on the back side. The same is true of the channel legged clamp plate 228 (FIG. 11).

Figure 5:
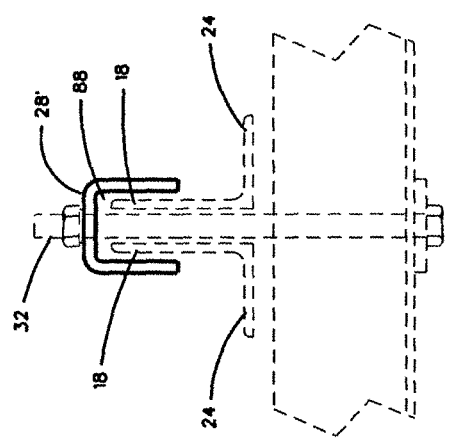
FIG. 5 is a front elevational view of an alternate embodiment of the legged clamp plate of FIGS. 2-4 in a joist lower flange application.

FIG. 5 is a front elevational view of an alternate embodiment of the legged clamp plate 28'. In this embodiment, the center tongue 76 (FIG. 2) is eliminated, leaving an undivided passage 88 as opposed to two flange slots 70 (FIG. 2). As seen in phantom, the undivided passage 88 is sufficiently wide to span between the vertical flanges 18 of the spanning angles 24. A larger diameter fastener 32 may be used in this embodiment to stabilize the legged clamp plate 28' on the spanning angles 24. A side elevational view of the legged clamp plate 28' could be identical to FIG. 3, or alternatively, as with the legged clamp plate 28, the open sides 82 of the legged clamp plate 28' may be solid walls, if desired. Likewise with respect to the embodiment shown in FIG. 12, the center tongue 276 may be eliminated from the channel legged clamp plate 228.

The legged fixture plate 52 (FIG. 1) or channel fixture plate 252 (FIG. 11) may be produced according to the description of the legged clamp plate 28 or channel legged clamp plate 228 discussed above. However, the legged fixture plate 52 or channel fixture plate 252 need not be identical to the legged clamp plate 28 or channel legged clamp plate 228. For example, the legged fixture plate 52 or channel fixture plate 252 may have an undivided passage 88 (FIG. 5), while the legged clamp plate 28 or channel legged clamp plate 228 has a center tongue 76, 276 (FIG. 2, FIG. 12) and vice versa. Regardless, the legged fixture plate 52 or channel fixture plate 252 allows relative movement of the hanger rod 56, 256 in a longitudinal direction along the spanning angles 24 or spanning channels 224, respectively. Furthermore, multiple fixture hanging assemblies 50 or channel fixture hanging assemblies 250 may be positioned on a single set of spanning angles 24 or spanning channels 224 to mount multiple ceiling fixtures.

In bar joist upper flange applications, the angle irons creating the upper flange are oriented essentially opposite from the previously described lower bar joist application. In other words, in upper flange applications, angle irons are oriented with their vertical flanges extending downwardly from their horizontal flange. The hanger assembly of the present disclosure may be configured for use with upper bar joist applications and/or with angle irons oriented with vertical flanges extending downwardly, as shown in the inverted hanger assembly 110 for metal bar joists 112 illustrated in FIG. 6. To accommodate this orientation, the washer clamp plate 30 of the first embodiment of FIG. 1 is inverted and disposed above the angle irons 116, and the legged clamp plate 28 of the first embodiment is inverted and disposed below the angle irons 116. As in the first embodiment, the angle irons 116 are separated from one another by a gap 120. The supported ceiling fixture is held in place by a fixture hanging assembly 150 consisting of a hanger rod 156 which passes through the apertures 154 in the legged fixture plate 152 and the washer fixture plate 153 and the angle irons 116. The hanger rod 156 is secured by nuts 160. The spanning angles 124 are held to the bar joists 112 at each end by a joist clamp assembly 126.

Figure 6:
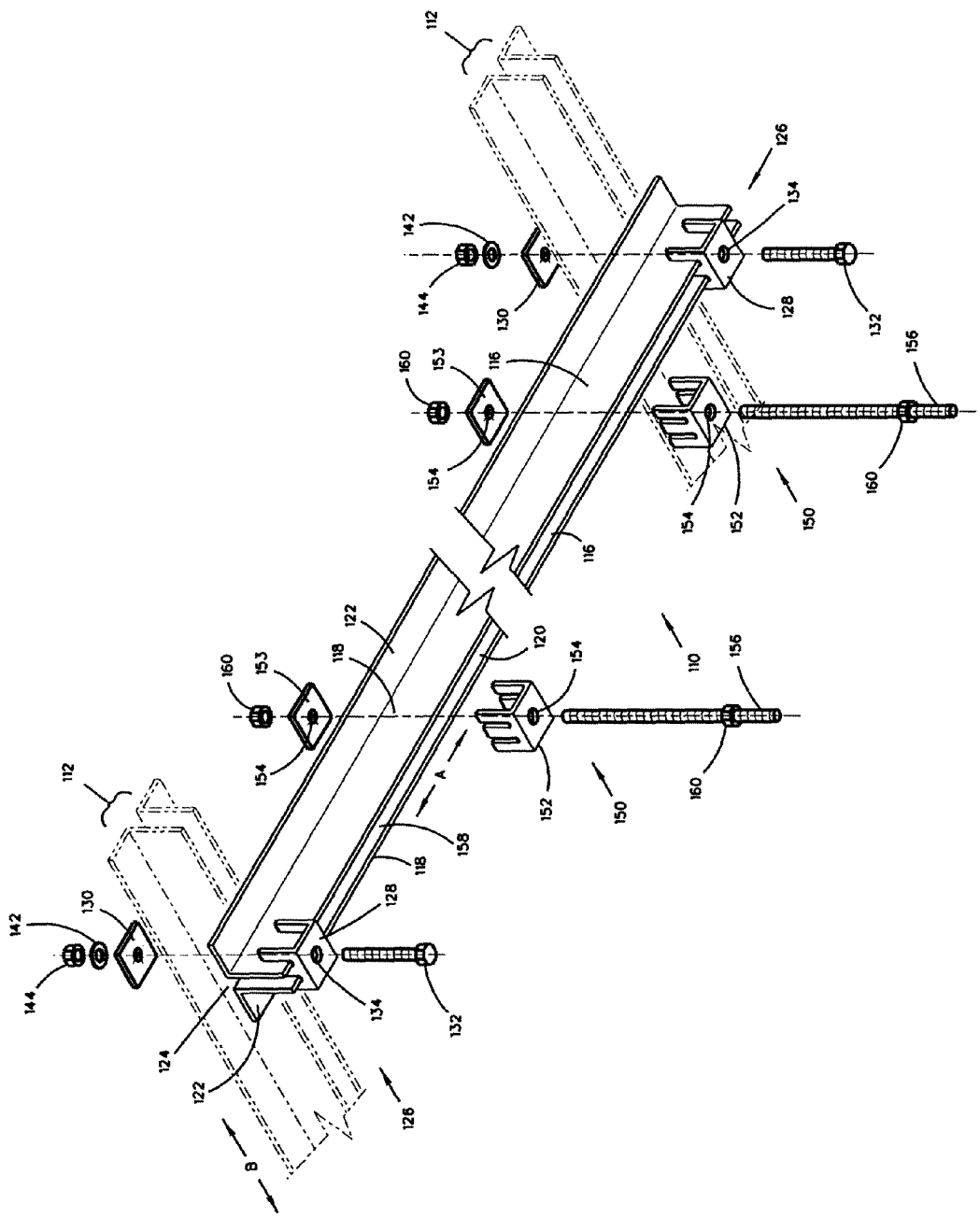
FIG. 6 is an exploded perspective view of an inverted hanger assembly in a joist upper flange application.

The legged clamp plate 128 in FIG. 6 is similar to the legged clamp plate 28 shown in FIGS. 1-4, with the only pictorial differences being that it is inverted and disposed below the angle irons 116 in FIG. 6 and the modification of reference numbers. The legged clamp plate 128 may ride along the vertical flanges 118 until located in a desired position, at which time the washer clamp plate 130 may be secured in place using the fastener 132 and a fastening device such as a washer 142 and nut 144.

Now considering an alternative arrangement of structural components to that shown in FIG. 11, due to symmetry of the channel members 216, the orientation of the channels is the same in upper flange and lower flange (FIG. 11) applications. In upper flange applications, the channel legged clamp plate (not shown) is inverted and disposed below the channel members 216, separated from one another by a center slot 258, and the channel washer clamp plate (not shown) is inverted and disposed above the spanning channels 224. Because the channel fixture plate 252 is disposed above and below the spanning channels 224, the orientation of the channel fixture plates 252 is unaffected.

Figure 7:
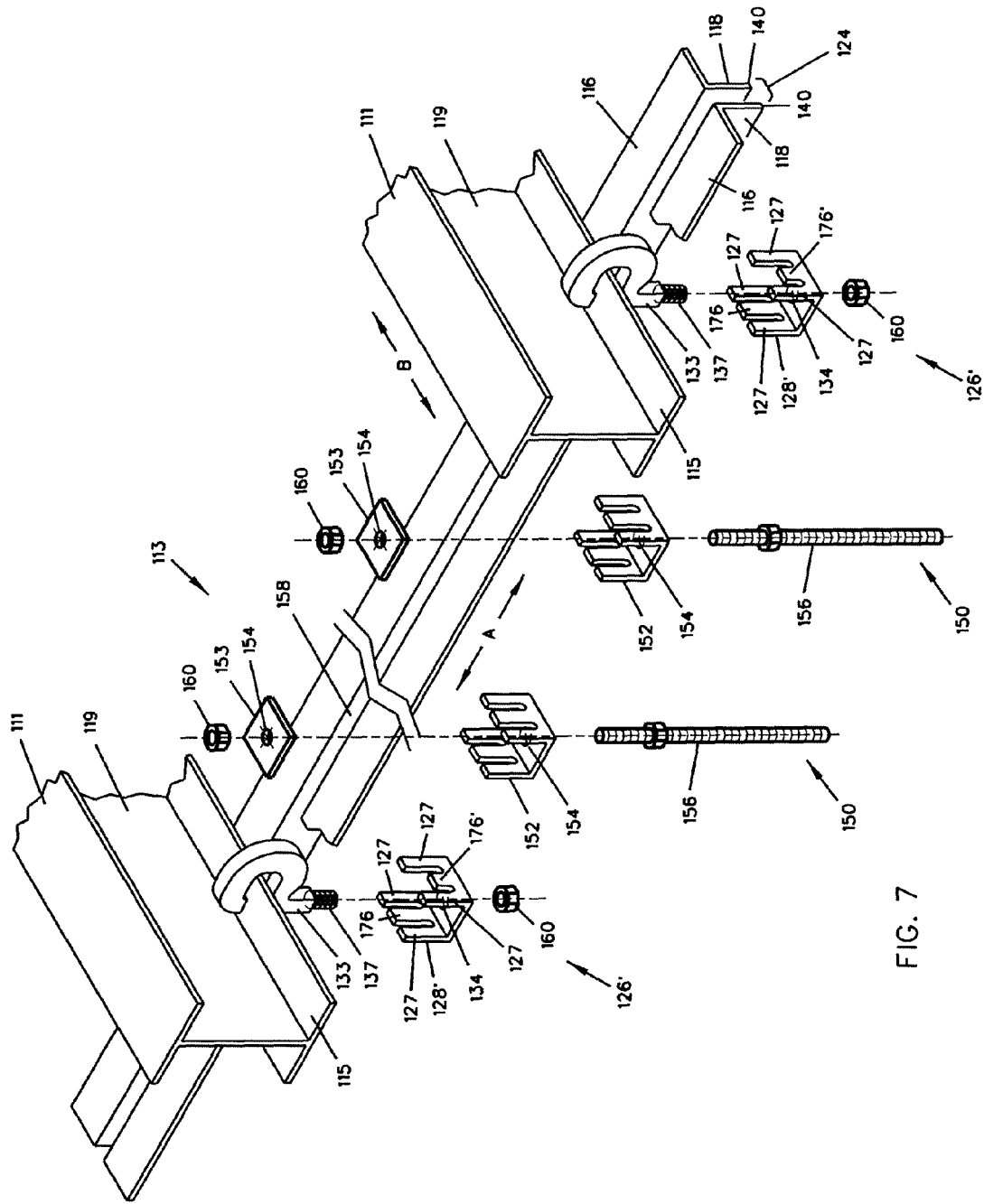
FIG. 7 is an exploded perspective view of another hanger assembly of the present disclosure in a beam lower flange application.

Beams, unlike joists, have solid webbing in-between the upper and lower flanges, therefore the hanger assembly must be attached either above the top flange or below the bottom flange. FIG. 7 is an exploded perspective view of a hanger assembly 113 in a beam lower flange application.

The hanger assembly 113 is supported by at least two parallel metal beams 111 that are spaced apart from one another. A fastener hook 133 of the hanger assembly 113 has an upper flange bearing surface 194 (see FIG. 9) that rests upon a top surface of the lower flange 115 of the beam 111. The angle irons 116 are oriented in the same way as those shown in FIG. 6, i.e. with the vertical flange 118 of each angle iron 116 extending downward from the horizontal flange 122.

The pair of angle irons 116 defines spanning angles 124 that span between the two beams 111 and is generally perpendicular to the beams 111. The spanning angles 124 are held in place on the beams 111 by a beam clamp assembly 126' at each end of the spanning angles 124. The beam clamp assembly 126' includes an alternate legged clamp plate 128', a fastener hook 133, and a fastening device such as a nut 160. The alternate legged clamp plate 128' includes an aperture 134 through which a threaded end 137 of the fastener hook 133 is received when securing the spanning angles 124 to the beams 111.

The side legs 127 of the alternate legged clamp plate 128' traps at least the bottom edges 140 of the vertical flanges 118 to allow relative movement between the alternate legged clamp plate 128' and the spanning angles 124 in the directions indicated by arrows A in FIG. 7. However, once the fastener hook 133 is placed through the aperture 134 in the alternate legged clamp plate 128', with the spanning angles 124 secured between the fastener hook 133 and alternate legged clamp plate 128', a fastening device such as a nut 160 may be tightened sufficiently to produce friction within the beam clamp assembly 126' that prevents relative movement between the spanning angles 124 and the beams 111.

On the other hand, when the nut 160 is loosened sufficiently, the friction decreases, allowing relative movement between the spanning angles 124 and the beams 111. The fastener hook 133 can slide along the lower flange 115, next to the webbing 119 when moving the spanning angles 124 in the direction indicated by arrows B relative to the beams 111.

In this manner, the spanning angles 124 may be secured to the beams 111, yet still be adjustable along a length of the beams 111.

As in FIG. 6, the legged fixture plate 152 (in the embodiment shown in FIG. 7) is disposed below the angle irons 116 and the washer fixture plate 153 is disposed above the angle irons 116. The legged fixture plate 152 allows relative movement of the hanger rod 156 in the directions indicated by arrows A along the spanning angles 124. Multiple fixture hanging assemblies 150 may be positioned on a single set of spanning angles 124 to mount multiple ceiling fixtures.

Figure 8:
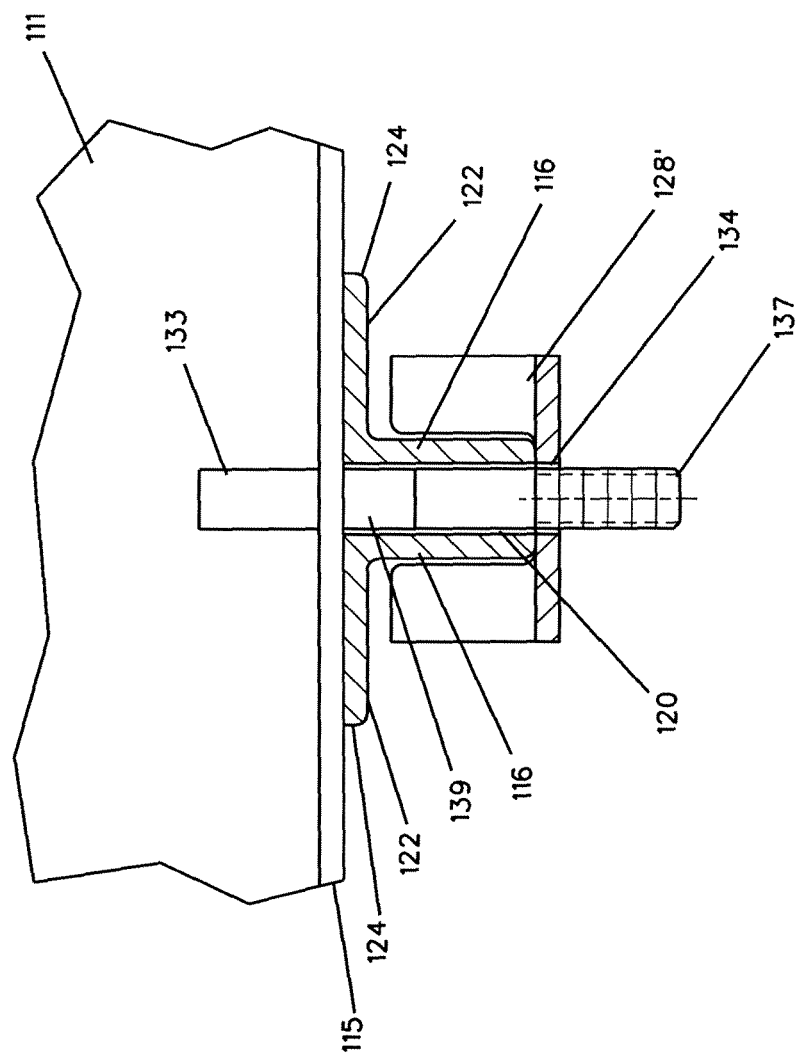
FIG. 8 is a front cross-sectional view of an alternate legged clamp plate and fastener hook in a beam lower flange application.

FIG. 8 is a front cross-sectional view of the alternate legged clamp plate 128' and fastener hook 133 in a beam lower flange application. A generally C-shaped portion 190 of the fastener hook 133 (see FIG. 9) has a downwardly-depending segment 192 at an upper end thereof. The downwardly-depending segment 192 terminates at an upper flange bearing surface 194 which bears against the top of the lower flange 115 of the beam 111. An opposite fastener end 196 of the fastener hook 133 includes a threaded end 137 of a downwardly-depending segment 192 at a lower end of the generally C-shaped portion 190. The threaded end 137 of the fastener end 196 is generally aligned with the downwardly-depending segment 192 of the fastener hook 133. The generally C-shaped portion 190 defines a mouth 139 (FIG. 8) of the fastener hook 133 that serves as a passage or flange slot, receiving one of the horizontal lower flanges 115 of the beam 111.

Figure 9:
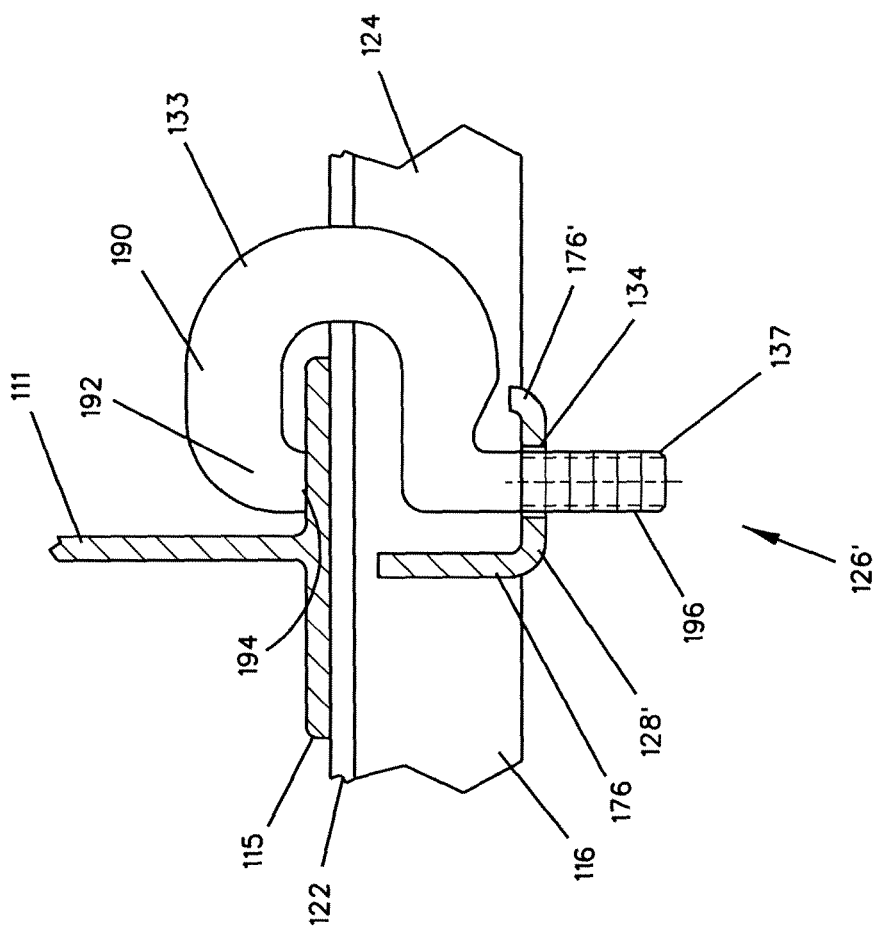
FIG. 9 is a side cross-sectional view of the alternate legged clamp plate and fastener hook in a beam lower flange application.
Figure 13:
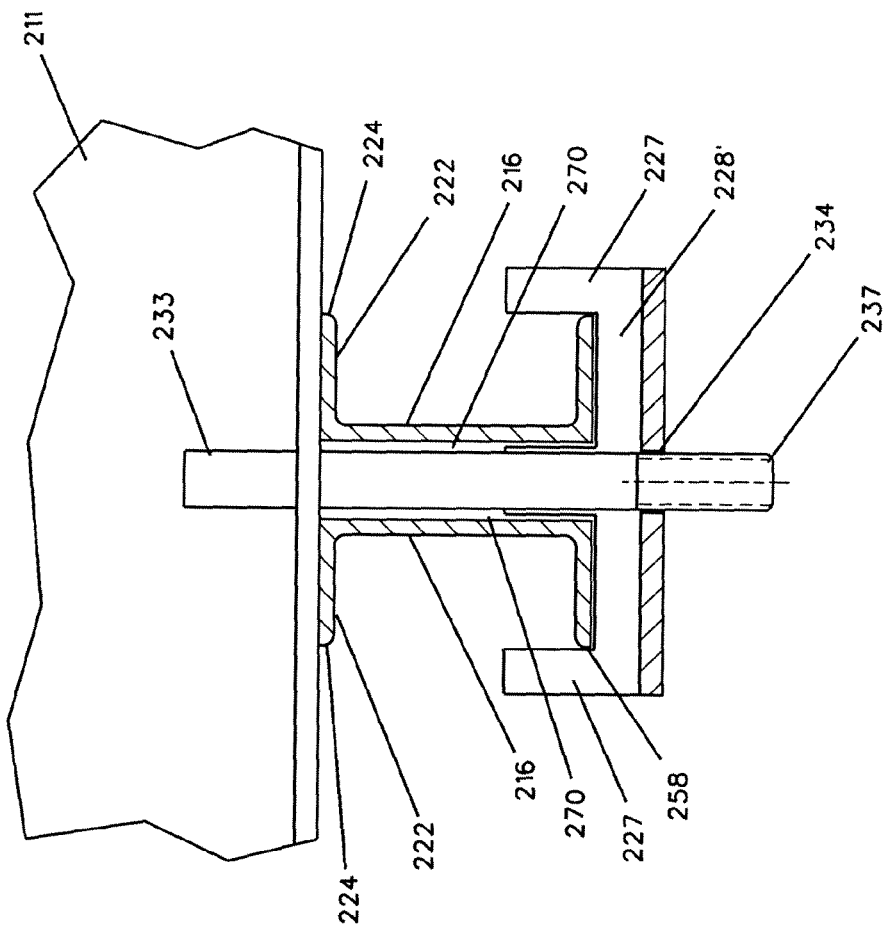
FIG. 13 is a front cross-sectional view of an alternate channel legged clamp plate and channel fastener hook in a beam lower flange application.

FIG. 13 is a front cross-sectional view of the alternate channel legged clamp plate 228' and channel fastener hook 233 in a beam lower flange application similar to the assemblies illustrated in FIGS. 7-9 with the only pictorial differences being the replacement of the spanning angles 124 with the spanning channels 224 and the modification of reference numbers. The alternate channel legged clamp plate 228' includes an aperture 234 through which a threaded end 237 of the channel fastener hook 233 is received when securing the spanning channels 224 to the beams 211.

FIG. 9 is a side cross-sectional view of the alternate legged clamp plate 128' and fastener hook 133 in a beam lower flange application. At least one of the two center tongues 176 of the alternate legged clamp plate 128' is shortened. The shortened center tongue 176' allows the fastener hook 133 to be inserted through the center slot 158 (FIG. 7) in the spanning angles 124, along the top of the shortened center tongue 176', and through the aperture 134. The shape of the fastener hook 133 may be adjusted to increase or decrease the strength or weight or improve ease of installation. The side view of the alternate channel legged clamp plate 228' and channel fastener hook 233 would be very similar to FIG. 9, with the only pictorial differences being the replacement of the spanning angles 124 with the spanning channels 224 and the modification of reference numbers.

Figure 10:
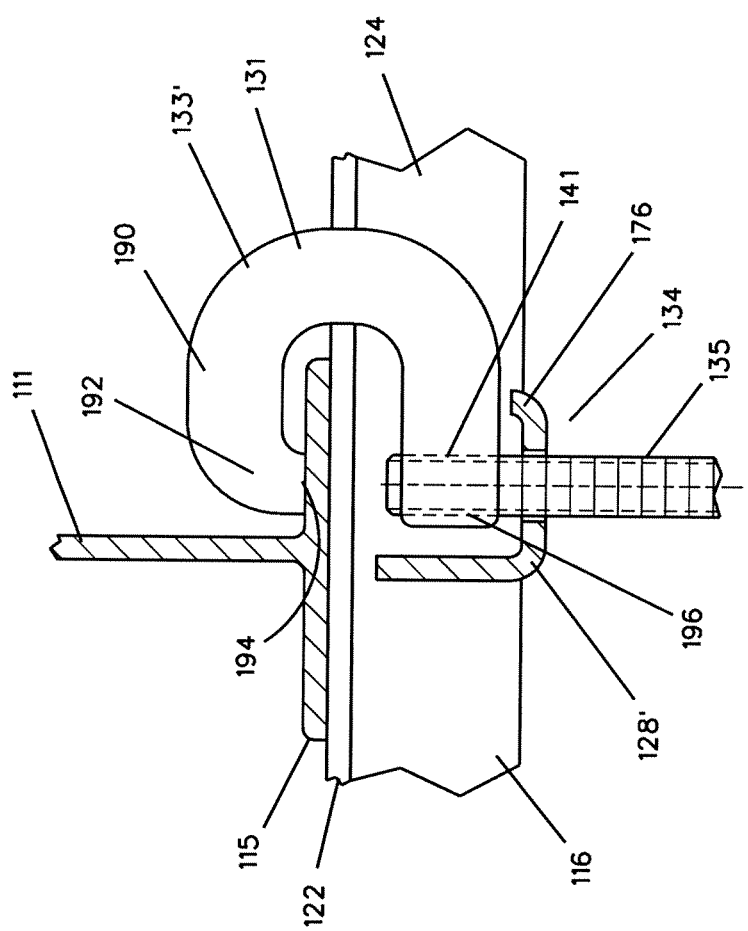
FIG. 10 is a side cross-sectional view of the alternate legged clamp plate and an alternate embodiment of the fastener hook in a beam lower flange application.

FIG. 10 is a side cross-sectional view of the alternate legged clamp plate 128' and an alternate embodiment of the alternate fastener hook 133' in a beam lower flange application. In this embodiment, the fastener end 196 of the fastener hook 133' is composed of two components: a tapped fastener hook 131 and a threaded rod 135. Various methods such as application of lock-tight or nylon rings may be used to secure the threaded rod 135 in the tapped hole 141. Different manufacturing methods will produce different embodiments of fastener hook 133 and channel fastener hook 233.

The adjustable hanger assemblies described herein provide quick and versatile apparatuses for hanging ceiling fixtures from bar joists or beams. Such adjustable hanger assemblies are especially useful in large warehouse-type structures where the roof is supported by a bar joist and/or beam truss support system. However, the adjustable hanger assemblies are adaptable for use with any joist or beam structure.

While various embodiments of clamps for use with bar joists and beams have been described herein, it is recognized that this disclosure is not limited to these embodiments. Adjustable hanger assemblies for use with angles and channels have been described herein. These clamps can be adapted for use with bars, tubes, and any number of elongate structural members. Variations may be made thereto which are still within the scope of the appended claims.

The following elements listing is for reference purposes only and is not intended to further limit any particular elements of the present disclosure.

ELEMENTS LISTING

10 Hanger assembly
11 Angle irons forming metal bar joists (12)
12 Metal bar joists
14 Top edges of the angle irons (11) forming the metal bar joists (12)
16 Angle irons
18 Vertical flanges of the angle irons (16) or spanning angles (24)
20 Gap between the vertical flanges (18)
22 Horizontal flanges of the angle irons (16)
24 Spanning angles
26 Joist clamp assembly for spanning angles (24)
27 Side legs
28 Legged clamp plate
28' Alternate embodiment of legged clamp plate (28)
29 Planar surface of legged clamp plate (28)
30 Washer clamp plate
31 Passage
32 Fastener
34 Aperture in legged clamp plate (28)
36 Threaded end of fastener (32)
38 Aperture in washer clamp plate (30)
40 Top edges of the vertical flanges (18)
42 Washer
44 Nut
46 Space in the bar joist (12)
50 Fixture hanging assembly
52 Legged fixture plate
53 Washer fixture plate
54 Aperture in legged and washer fixture plate (52, 53)
56 Hanger rod
58 Center slot in spanning angles (24)
60 Nut
70 Flange slot in legged clamp plate (28)
72 Bottom edge of legged clamp plate (28)
74 Top edge of legged clamp plate (28)
76 Center tongue of legged clamp plate (28)
80 Lower flanges of the bar joist (12)
82 Open sides of legged clamp plate (28)
88 Undivided passage in legged clamp plate (28')
110 Inverted hanger assembly for metal bar joists (112)
111 Metal beams
112 Metal bar joists
113 Hanger assembly for metal beams (111)
115 Lower flange of metal beam (111)
116 Angle irons
118 Vertical flanges of the angle irons (116)
119 Webbing of metal beam (111)
120 Gap between the angle irons (116)
122 Horizontal flanges of the angle irons (116)
124 Spanning angles 126 Joist clamp assembly for spanning angles (124)
126' Beam clamp assembly for spanning angles (124)
127 Side legs
128 Legged clamp plate
128' Alternate legged clamp plate
130 Washer clamp plate
131 Tapped fastener hook
132 Fastener
133 Fastener hook
133' Alternate fastener hook
134 Aperture in legged clamp plate (128) or alternate legged clamp plate (128')
135 Threaded rod
137 Threaded end of fastener hook (133) or fastener end (196)
139 Mouth of fastener hook (133)
140 Bottom edges of the vertical flanges (118)
141 Tapped hole of tapped fastener hook (131)
142 Washer
144 Nut
150 Fixture hanging assembly
152 Legged fixture plate
153 Washer fixture plate
154 Aperture in legged and washer fixture plate (152, 153)
156 Hanger rod
158 Center slot in spanning angles (124)
160 Nut
176 Center tongue
176' Shortened center tongue (128')
190 Generally "C"-shaped portion of fastener hook (133)
192 Downwardly-depending segment of generally C-shaped portion (190)
194 Upper flange bearing surface
196 Fastener end
210 Alternate embodiment of the hanger assembly
211 Metal beams
212 Metal bar joists
214 Top edges of the metal bar joists (212)
216 Channel members
218 Webbing
222 Flanges of the channel members (216) and spanning channels (224)
224 Spanning channels
226 Joist clamp assembly for spanning channels (224)
227 Side legs extending from planar surface (229)
228 Channel legged clamp plate
228' Alternate channel legged clamp plate
229 Planar surface of channel legged clamp plate (228)
230 Channel washer clamp plate
231 Passage
232 Fastener
233 Channel fastener hook
234 Aperture in channel legged clamp plate (228) or channel alternate legged clamp plate (228')
236 Threaded end of fastener (232)
237 Threaded end of fastener hook (133)
238 Aperture in channel washer clamp plate (230)
242 Washer
244 Nut
246 Space in the bar joist (212)
250 Channel fixture hanging assembly
252 Channel fixture plate
254 Aperture in channel fixture plate (252)
256 Hanger rod
258 Center slot in spanning channels (224)
260 Nut
270 Flange slot in channel legged clamp plate (228)
272 Bottom edge of channel legged clamp plate (228)
276 Center tongue of channel legged clamp plate (228)
280 Lower flanges of the bar joist (212)

I claim:

1. An assembly for securing a pair of spanning angles to bar joists and bracing the spanning angles against each other, the assembly comprising:
   a clamp plate and a washer plate each of which has a generally flat planar surface in which an aperture is formed, the apertures aligning with each other;
   a first pair of side legs extending perpendicularly to the clamp plate from one side thereof and a second pair of side legs extending perpendicularly to the clamp plate from an opposite side thereof, and a center tongue extending perpendicularly to the clamp plate between each respective pair of side legs so to form a passage between the center tongue and each leg of the respective pairs of legs, each passage configured to receive a flange of a spanning angle;
   the washer plate being free on all outermost edges so to abut against a surface of a spanning angle; and
   a fastener extending through the apertures in the respective plates and secured thereto thereby to attach the assembly to the spanning angles and brace the spanning angles against each other in their weak axes.

2. The assembly of claim 1 in which the distance between the legs comprising the respective first and second pairs of side legs is uniform throughout the length of the respective pairs of side legs.

3. The assembly of claim 2 wherein each respective center tongue is equally spaced from each of the side legs comprising each respective pair of side legs.

4. The assembly of claim 3 wherein each passage is configured to receive a generally vertical flange of a respective spanning angle.

5. The assembly of claim 1 wherein the fastener comprises a hanger rod configured for adjustable support of an assembly formed by the spanning angles and bar joists.

6. The assembly of claim 1 wherein the fastener comprises a generally C-shaped hook configured for detachable engagement with a beam.

* * * * *